US007738245B1

(12) United States Patent
Stifal

(10) Patent No.: US 7,738,245 B1
(45) Date of Patent: Jun. 15, 2010

(54) DISPLAY MOUNT

(75) Inventor: Matthew William Stifal, Portage, IN (US)

(73) Assignee: Peerless Industries, Inc., Melrose Park, IL (US)

( * ) Notice: Subject to any disclaimer, the term of this patent is extended or adjusted under 35 U.S.C. 154(b) by 0 days.

(21) Appl. No.: 12/624,134

(22) Filed: Nov. 23, 2009

(51) Int. Cl.
G06F 1/16 (2006.01)
H05K 5/00 (2006.01)
H05K 7/00 (2006.01)

(52) U.S. Cl. ............... 361/679.21; 248/917; 348/837

(58) Field of Classification Search ............ 361/679.01, 361/679.21, 679.02, 679.58, 679.6; 248/917; 348/837
See application file for complete search history.

(56) References Cited

U.S. PATENT DOCUMENTS

| | | | |
|---|---|---|---|
| D312,185 S | 11/1990 | Prater, Sr. | |
| D314,483 S | 2/1991 | Zimpriech et al. | |
| 4,993,676 A | 2/1991 | Fitts et al. | |
| D316,790 S | 5/1991 | Robbins et al. | |
| 5,064,161 A | 11/1991 | Anderson | |
| 5,148,282 A | 9/1992 | Sedighzadeh | |
| D333,061 S | 2/1993 | Sedighzadeh | |
| D333,398 S | 2/1993 | Sedighzadeh et al. | |
| D334,861 S | 4/1993 | Cheng | |
| D350,664 S | 9/1994 | Vogels | |
| 5,405,117 A * | 4/1995 | Davis ..................... | 248/333 |
| D365,951 S | 1/1996 | Walters, III | |
| D377,897 S | 2/1997 | Vogels | |
| D388,646 S | 1/1998 | Canton Gongora et al. | |
| D392,131 S | 3/1998 | Flagg | |
| D394,570 S | 5/1998 | Walters, III | |
| 5,797,568 A * | 8/1998 | Canton Gongora et al. ...... | 248/122.1 |
| D410,836 S | 6/1999 | Vogels | |
| 6,343,006 B1 * | 1/2002 | Moscovitch et al. ... | 361/679.04 |
| 6,554,238 B1 | 4/2003 | Hibberd | |
| 6,639,789 B2 * | 10/2003 | Beger ..................... | 606/46 |
| 6,695,265 B2 * | 2/2004 | Neuhof et al. ............. | 248/56 |
| 6,739,096 B2 | 5/2004 | Feldpausch et al. | |
| D493,800 S | 8/2004 | Pfister et al. | |
| 6,857,610 B1 * | 2/2005 | Conner et al. ............ | 248/284.1 |
| 7,061,754 B2 * | 6/2006 | Moscovitch ............ | 361/679.21 |
| D528,901 S | 9/2006 | David | |
| D538,141 S | 3/2007 | Stenhouse et al. | |
| 7,195,214 B2 * | 3/2007 | Lee et al. ................. | 248/125.8 |
| D546,610 S | 7/2007 | Blanchard | |

(Continued)

OTHER PUBLICATIONS

U.S. Appl. No. 29/344,808, filed Oct. 5, 2009, Matthew William Stifal.

(Continued)

*Primary Examiner*—Jayprakash N Gandhi
*Assistant Examiner*—Adrian S Wilson
(74) *Attorney, Agent, or Firm*—Foley & Lardner LLP

(57) ABSTRACT

A mounting system for mounting a plurality of devices to a surface, including an overhead surface. According to various embodiments, a support arm is configured to operatively attach to a mounting surface and is operatively connected to a plurality of device support assemblies that include a mount bracket a selectively moveable tilt bracket. A device support member is operatively coupled to the tilt brackets and configured to operatively attach to at least one display device such as a flat panel display. The device support member, and attached devices, are selectively tiltable to a tilt angle.

20 Claims, 5 Drawing Sheets

U.S. PATENT DOCUMENTS

| | | | |
|---|---|---|---|
| D560,668 S | | 1/2008 | Pritchard et al. |
| 7,320,454 B2 | | 1/2008 | Lee et al. |
| D563,700 S | | 3/2008 | Walters et al. |
| D565,399 S | | 4/2008 | Grey |
| D566,444 S | | 4/2008 | Grey |
| D568,321 S | | 5/2008 | Gillespie |
| D568,322 S | | 5/2008 | Gillespie et al. |
| D568,323 S | | 5/2008 | Gillespie et al. |
| 7,395,996 B2 | * | 7/2008 | Dittmer .................. 248/291.1 |
| 7,438,269 B2 | * | 10/2008 | Pfister et al. ........... 248/292.14 |
| D581,914 S | | 12/2008 | Bures et al. |
| D591,756 S | | 5/2009 | Wohlford et al. |
| 7,607,620 B2 | * | 10/2009 | Ozolins et al. ........... 248/122.1 |
| 2002/0011544 A1 | * | 1/2002 | Bosson ....................... 248/121 |
| 2004/0118984 A1 | * | 6/2004 | Kim et al. ................... 248/149 |
| 2004/0251390 A1 | | 12/2004 | Wachob |
| 2005/0051692 A1 | * | 3/2005 | Jung et al. .................. 248/371 |
| 2008/0117578 A1 | * | 5/2008 | Moscovitch ................ 361/681 |
| 2008/0128574 A1 | | 6/2008 | Walters et al. |
| 2008/0284676 A1 | * | 11/2008 | Moscovitch ................ 345/1.3 |
| 2009/0021655 A1 | | 1/2009 | Walters |
| 2009/0079665 A1 | * | 3/2009 | Moscovitch ................ 345/1.3 |

OTHER PUBLICATIONS

U.S. Appl. No. 29/334,842, filed Oct. 5, 2009, Matthew William Stifal.

RCD 000686258-0001, Mar. 27, 2007, Colebrook Bosson Saunders Products Ltd.

Non-Final Office Action for U.S. Appl. No. 29/344,808, dated Nov. 2, 2009.

Non-Final Office Action for U.S. Appl. No. 29/344,842, dared Nov. 2, 2009.

Model PM-D—Dual Plasma Bracket, Video Furniture International, http://www.video-furn.com, Sep. 23, 2009.

Plasma Swivel Mount and Plasma Screen Mount, ERGO In Demand, http://www.ergoindemand.com/plasma-swivel-screen-mount.htm, Sep. 22, 2009.

Jumbo DLP Ceiling Mount, HT Market, http://www.htmarket.com/jmc-dlp50.html, Sep. 23, 2009.

Telescopic Pole LCD Ceiling Mount, Sallas Industrial Co., Ltd., http://www.allproducts.com/showcase/sallas/Product-200478221918.html, Sep. 22, 2009.

Advance Quick Link® Plasma Ceiling Mounts, Dalite, http://www.dalite.com, Sep. 22, 2009.

Peerless PLCK-1-Flat Panel Conversion Kit for up to 50" Flat Panels (wo/ adapter plate), Peerless Industries, Inc., http://ww-wracksandstands.com/Peerless-PLCK-1-PE1173.html, Sep. 22, 2009.

2C Ceiling Mounting Brackets for Panels, 2C OVERHEAD IT, 2C Display Accessories, http://www.2cdisplays.com.au/html/2C_products_panel_ceiling.html, Sep. 23, 2009.

PAC722 Dual Side-by Side Accesory, Chief, http://chiefmfg.com/productdetail.aspx?AccessoryID=1089, Sep. 29, 2009.

"Installation and Assembly: Solid Point™ FlatPanel Street Column Ceiling Mount," Peerless Industries, Inc., Feb. 16, 2006.

VMPU—100L Wall Mounts; AVTEQ, http://www.avteq.net, Sep. 23, 2009.

"Installation and Assembly: Custom Dual Screen Ceiling Mount," Peerless Industries, Inc., Nov. 6, 2007.

"Installation and Assembly: Custom Double Mount," Peerless Industries, Inc., Apr. 19, 2007.

Dual and Quad TV Monitor Mounts—Multi Mount TV Pedestal and Ceiling Systems, ERGO In Demand, http://www.ergoindemand.com/dua-quad-mounts.htm, Sep. 22, 2009.

TKLA-7837, Fogim Enterprise Corporation, http://www.fogim-ent.com, 2008.

Peerless (ACC912) Lightweight Cathedral Ceiling Adapter, Peerless Industries, Inc., http://www.projectorzone.com/Peerless-ACC912, Sep. 22, 2009.

* cited by examiner

DISPLAY MOUNT

FIELD OF THE INVENTION

The present invention relates generally to mounting systems for devices. More particularly, the present invention relates to mounting systems for mounting multiple flat-panel displays and similar devices

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television.

Flat panel displays, on the other hand, may be mounted directly to a wall or other surface. With these considerations in mind, there have been various attempts to develop mounting systems that address mounting of flat panel display devices. Besides wall mounts, there have been various attempts to produce overhead mounts capable of suspending a display from a ceiling. Still other mounts have been developed that enable simultaneous mounting of multiple displays.

SUMMARY

Various embodiments comprise systems for mounting multiple display devices, including multiple LCD and plasma flat panel displays. The present mounting systems are particularly well suited to mounting a plurality of display devices from a ceiling or other overhead surface such as where a wall or similar surface may not be near or practical for mounting the displays. The mounting system is configured to mount multiple displays in a display plane that maintains the vertical alignment of the attached displays such that the displays are positioned at the same height and the orientation. The present mounting system may also be used for mounting displays to a wall or other horizontal surface. The mounting systems are further selectively adjustable to provide a desired tilt angle for the attached display devices to enhance viewing of the displays when mounted overhead.

In one set of embodiments, a display mount for mounting a plurality of displays to a surface comprises a surface bracket that is configured to operatively attach to an overheard surface, a support arm operatively coupled to the surface bracket, and a plurality of device mount assemblies operatively coupled to the support arm. Each of the plurality of device mount assemblies is configured to support at least one display device, and includes a mount bracket and a tilt bracket that is selectively moveable in relation to the mount bracket. The mounting system further comprises a device support member operatively connected to at least two of the plurality of tilt brackets and is configured to operatively attach to a plurality of display devices. The display mount may also include a rear cover operatively coupled to the support arm or other feature and configured to conceal at least the plurality of device mount assemblies and at least a portion of the plurality of display devices. Each of the tilt brackets is selectively tiltable in relation to the mount bracket such that the device support member and the attached display devices are selectively tiltable to a tilt angle.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
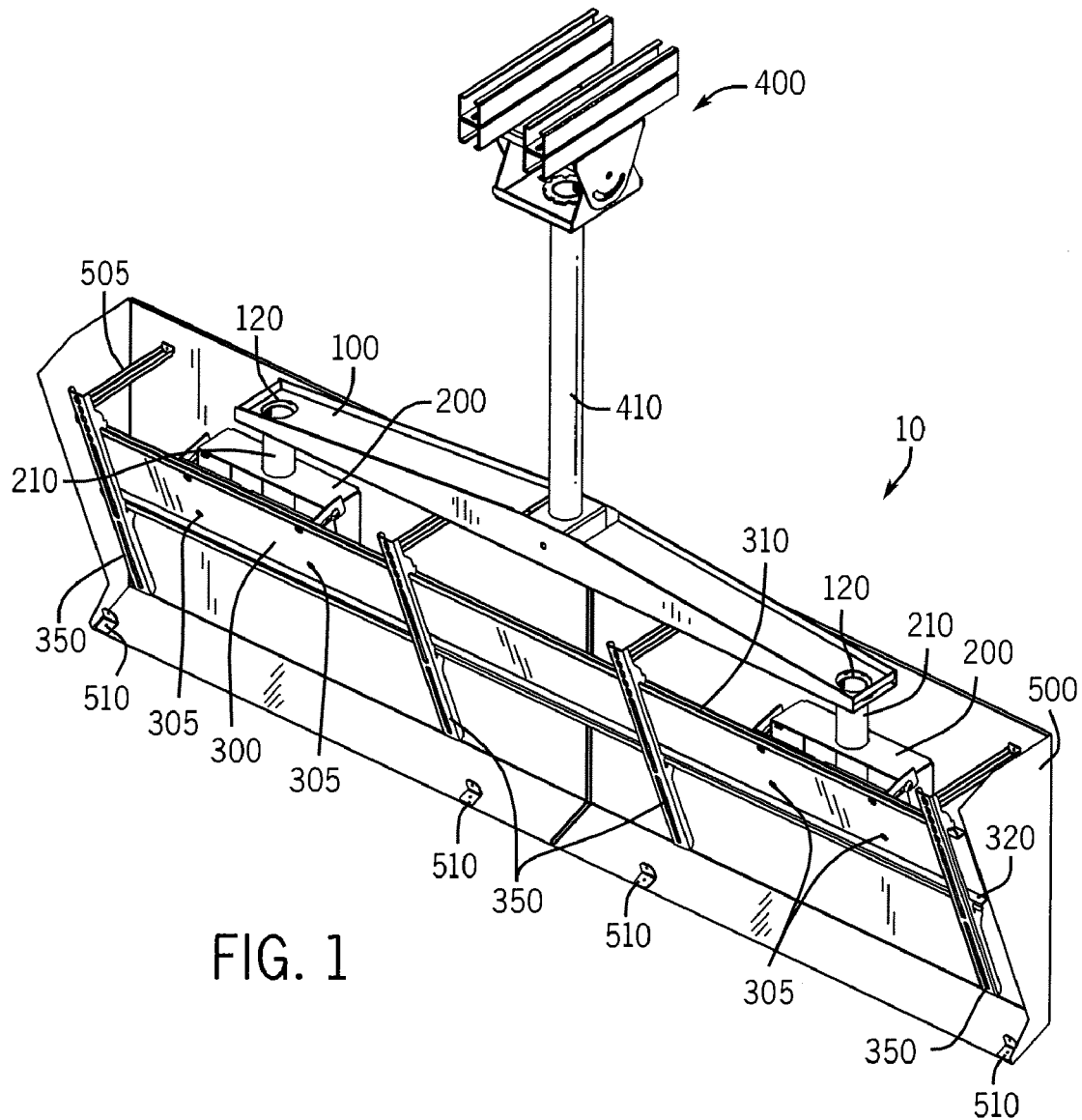
FIG. 1 is a perspective view of a mounting system constructed in accordance with an embodiment of the present invention.

FIGS. 1-7 illustrates a mounting system 10 constructed in accordance with an embodiment of the present invention. The mounting system 10 comprises a support arm 100 operatively coupled to a device mount assembly 200. The device mount assembly 200 is configured to operatively attach to a device such as a display device 20. A plurality of the device mount assemblies 200 may be operatively coupled to the support arm 100, with each device mount assembly 200 capable of supporting one or more displays. The mounting system 10 further comprises a device support member 300 operatively coupled to the device mount assemblies 200. The device support member 300 may be configured to operatively attach to one or more display devices. A plurality of device brackets 350 may be operatively coupled to the device support member 300 to facilitate attachment of the display devices 20. The mounting system 10 may further comprise a surface mount assembly 400 configured to operatively attach to a mounting surface (not shown) and operatively coupled to the support arm 100. The mounting system 10 may also include a rear cover 500 that conceals at least a portion of rear surfaces of the attached displays and the mounting system 10. As depicted in FIG. 1, the mounting system 10 is configured to support two display devices 20, such as two flat panel display devices 20, side-by-side and at the same height and tilt orientation. However, it will be appreciated that alternative device configurations may be achieved with the mounting system 10, and are within the scope of the systems described herein.

It should be understood that, as used herein, the phrases "operatively connected," "operatively coupled" and "operative attachment" do not require the specified components be directly connected or in direct physical contact with each other. Instead, an operative connection, coupling or attachment can involve the use of a number of intermediate components.

Figure 2:
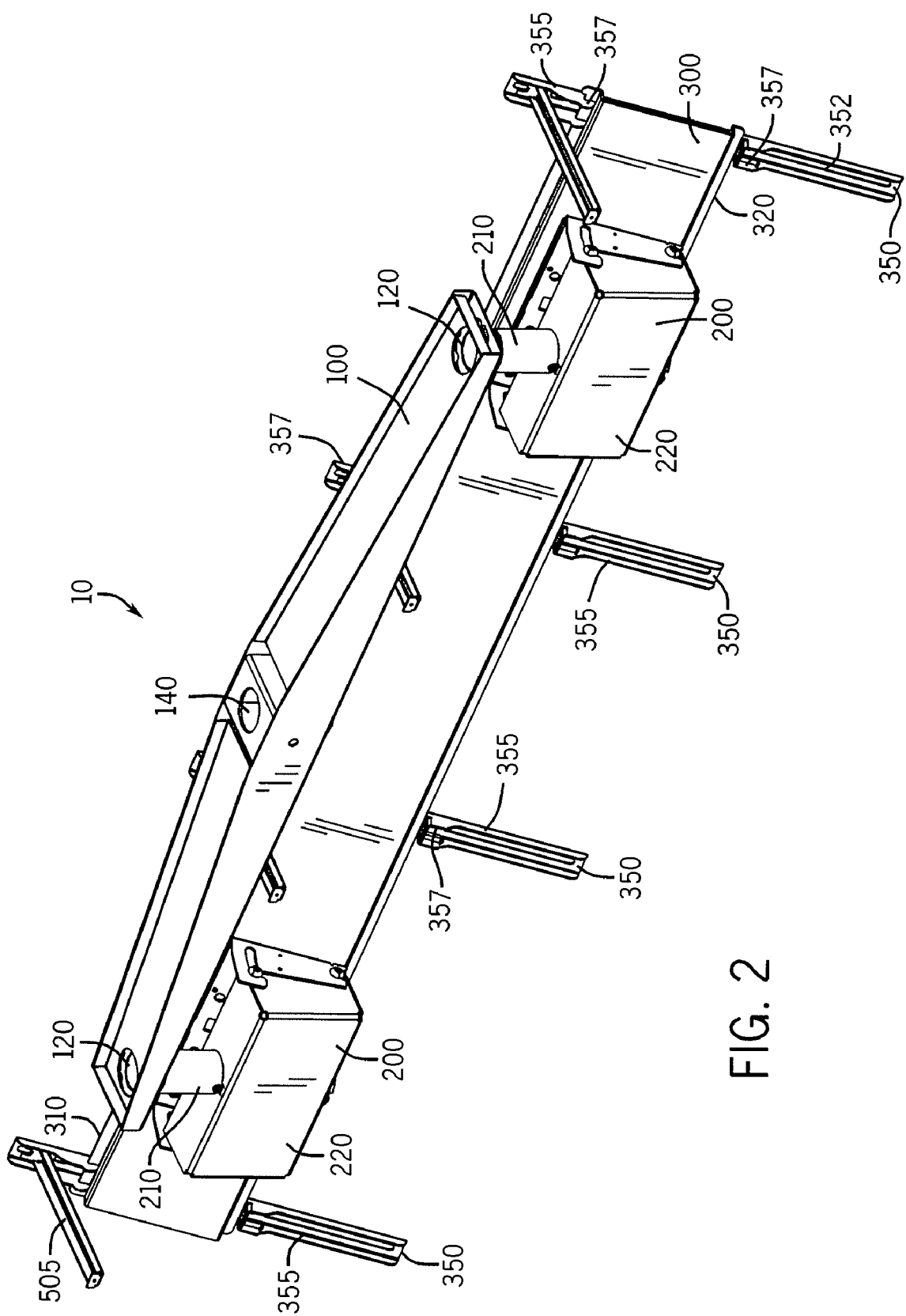
FIG. 2 is a reverse perspective view of the mounting system of FIG. 1, with certain features removed for clarity.

With reference to FIGS. 1 and 2, the support arm 100 generally comprises a member or a plurality of members capable of supporting the weight of two or more display devices attached to the mounting system 10. In the depicted configuration, the support arm 100 is an elongated member configured to support two devices in a side-by-side configuration. However, the support arm 100 may be configured to support other device configurations. For example, devices may be arranged rear-to-rear, orthogonally disposed, angularly disposed, top-to-bottom, offset, and combinations thereof. The support arm 100 can be of a fixed length as depicted. However, in other embodiments, the support arm 100 may have a selectively adjustable length to accommodate a variety of devices of various dimensions. For example, the support arm 100 may comprise an assembly of telescoping members that are selectively postionable to form a support arm 100 of adjustable length. Regardless of the specific configuration, it will be appreciated that the support arm 100 must be of sufficient strength and rigidity to safely and securely support the weight of the devices attached to the mounting system 10.

With reference to FIG. 2, the support arm 100 includes a mount assembly engagement feature 120. The mount assembly engagement feature 120 is configured to operatively couple a device mount assembly 200 to the support arm 100. As depicted, the mount assembly engagement feature 120 comprises an opening to receive a mount assembly post 210. The mount assembly post 210 may be securely affixed to the support arm 100 by various techniques, including connecting elements, threaded attachment, welding, press fitting, and combinations thereof. In an alternative embodiment, the mount assembly post 210 is selectively rotatable in relation to at least one the support arm 100 and the device mount assembly 200 such that an attached device may be rotated relative to the mounting surface about, for example, a substantially vertical axis. As shown in FIG. 2, the mount assembly engagement feature 120 is disposed proximate each end of the support arm 100. However, depending on the number of devices to be mounted to mounting system 10, the support arm 100 may have additional or fewer mount assembly engagement features 120. The support arm 100 may also include a plurality of mount assembly engagement features 120, or the mount assembly engagement feature 120 may comprise a slot in order to provide alternative mounting positions for the device mount assembly 200 on the support arm 100 such that, for example, devices of varying dimensions may be readily accommodated. Alternatively, each device mount assembly 200 may be directly or operatively coupled to the support arm 100 with the use of the mount assembly engagement feature 120.

FIG. 2 further shows a surface mount assembly engagement feature 140 disposed on the support arm 100. With reference to FIGS. 1 and 2, the surface mount assembly engagement feature 140 is configured to operatively couple the support arm 100 and the surface mount assembly 400. As depicted, the surface mount assembly engagement feature 140 comprises an opening to receive a surface assembly post 410. The surface assembly post 410 may be securely affixed to the support arm 100 by various techniques, including connecting elements, threaded attachment, welding, press fitting, and combinations thereof. In an alternative embodiment, the support arm 100 is selectively rotatable in relation to surface assembly post 410 about an axis substantially defined by the surface assembly post 410. The surface assembly post 410 may also, or alternatively, be selectively rotatable in relation to the surface mount assembly 400 about an axis substantially defined by the length of the surface assembly post 410, again allowing selective rotation of the support arm 100 in a substantially horizontal plane when the mounting system 10 is attached to an overhead surface.

As depicted in FIG. 1, the surface assembly post 410 generally comprises an elongated tube or post of fixed length. However, in other embodiments, the surface assembly post 410 may comprise, for example, adjustably telescoping tubes that permit the length of the surface assembly post 410 to have a selectively adjustable length to accommodate various mounting conditions. In still further embodiments, the support arm 100 may be attached at various locations along the surface assembly post 410 such that an excess portion of the surface assembly post 410 may be partially received within the mounting system 10 below the support arm 100. The surface mount assembly 400 is configured to secure to a mounting surface (not shown). The mounting system 10, as depicted, is particularly adapted for securement of the surface mount assembly 400 to an overhead surface such as a ceiling or other overhead surface or feature within a structure. However, variations of the surface assembly post 410 and/or the surface mount assembly 400 permit securement of the mounting system 10 to a substantially horizontal feature such as a wall or other structure.

Figure 3:
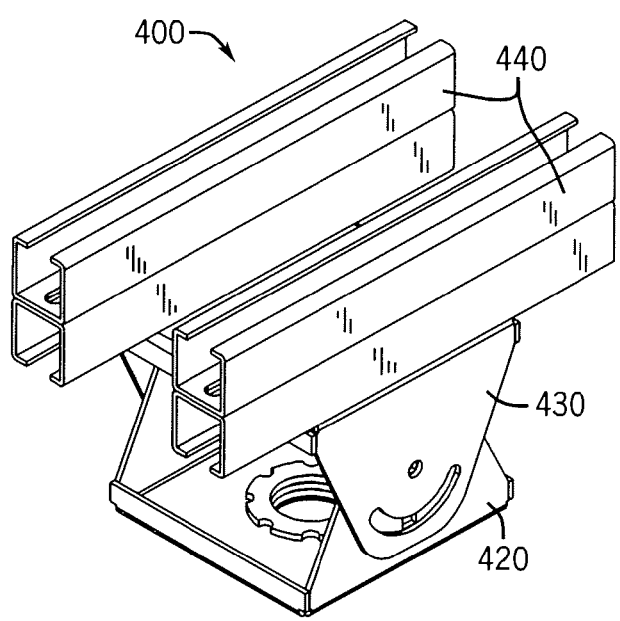
FIG. 3 is a perspective view showing a surface mount assembly of the mounting system of FIG. 1.

As shown in FIG. 3, the surface mount assembly 400 comprises a lower surface bracket 420 pivotally coupled to an upper surface bracket 430. The surface mount assembly 400 may further include surface attachments 440 configured to attach to the mounting surface or for mating with corresponding structures (not shown) secured to or forming the mounting surface. Alternatively, the upper surface bracket 430 may be directly or operatively attached to the mounting surface. The pivoting connection between the lower surface bracket 420 and the upper surface bracket 430 of the depicted surface mount assembly 400 is particularly well-suited for attachment of the mounting system 10 to an inclined mounting surface or structure, for example, a sloped or cathedral ceiling. In such mounting environments, the lower surface bracket 420 pivots relative to the upper surface bracket 430, allowing the surface assembly post 410 to hang in a substantially vertical orientation regardless of the inclination of the mounting surface.

Figure 4A:
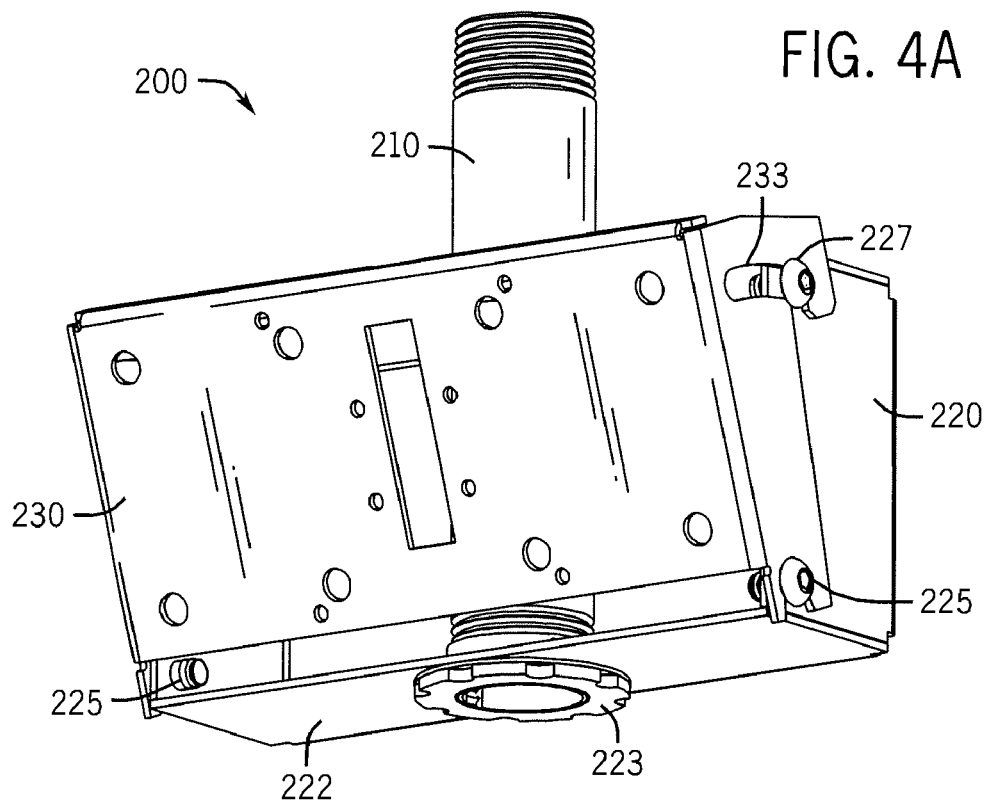
FIG. 4A is a perspective view showing a device mount assembly of the mounting system of FIG. 1.
Figure 4B:
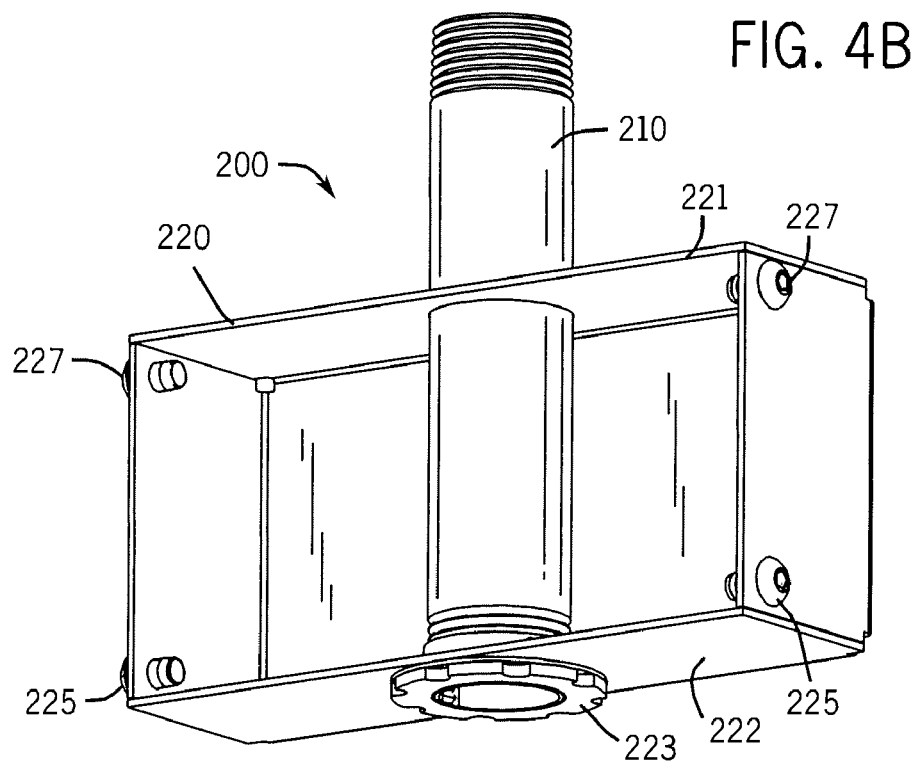
FIG. 4B is a perspective showing the device mount assembly of FIG. 4A, with certain features removed for clarity.

With reference to FIGS. 2, 4A and 4B, the mounting system 10 includes at least one device mount assembly 200 operatively coupled to the support arm 100. The device mount assembly 200 comprises a mount bracket 220 and a tilt bracket 230. The mount bracket 220 is operatively coupled to the mount assembly post 210. As shown in FIG. 4B, the mount assembly post 210 is received in openings disposed in a mount bracket top portion 221 and a mount bracket bottom portion 222. The mount assembly post 210 is theadedly coupled to a collar 223 thereby securing the mount bracket 220 and the mount assembly post 210. However, in alternative embodiments, the mount bracket 220 may be secured to the mount assembly post 210 by other techniques, including welding, connecting elements and combinations thereof. In still other embodiments, the device mount assembly 200 may be directly or operatively coupled to the support arm 100.

As shown in FIG. 1, a device support member 300 is operatively coupled to each of the tilt brackets 230. The device support member 300 may be secured to the tilt bracket 230 by a plurality of connecting elements 305. However, the device support member 300 may be otherwise operatively or directly coupled to the tilt bracket 230. As depicted in FIG. 1, the device support member 300 generally comprises an elongated plate defining a mounting plane that spans substantially the length of the mounting system 10. The device support member 300 is configured to operatively attach to one or more display devices in the mounting plane. As shown, the device support member 300 is operatively coupled to each of the device mount assemblies 200. In this configuration, where the device support member 300 is coupled to a plurality of device mount assemblies 200, the attached display devices are orientated in the display plane and are vertically aligned such that each of the displays is at substantially the same height. Additionally, and as explained in more detail below, the display plane and the plurality of attached display devices may be tilted to a uniform tilt angle.

An attached display device may be directly attached to the device support member 300 or, as shown in FIG. 1, the mounting system 10 may include a plurality of device brackets 350 attachable to the device support member 300. As depicted in FIG. 2, each of the plurality of device brackets 350 comprise an elongated member and may include a device surface 352 having a number of device securement openings 355. In a particular embodiment, the device securement openings 355 may include a plurality of openings adapted to receive connecting elements to secure a device such as a flat panel display to the mounting system 10. The plurality of openings 355 may be located on the device support bracket 350 to align with attachment points on the flat panel display located according to industry standard. An engagement mechanism 357 may extend from the device surface 352 and engage the device support member 300. In a particular embodiment, the engagement mechanism comprises a hook.

As shown in FIG. 1, the device support member 300 includes a top lip 310 and a bottom lip 320. The engagement mechanism 357 engages the top lip 310 and the bottom lip 320, securing each of the device brackets 350 to the device support member 300. As such, the device brackets 350, attached to the standard attachments of the display devices 20, are engaged with the support member 300 via the engagement mechanisms 357 associated with the respective display devices 20, thereby mounting multiple display devices on the mounting system 10 at substantially the same height. This arrangement also permits each of the plurality of device brackets 350 to slide along the length of the device support member 300 and be positioned to accommodate devices of a variety dimensions and mounting configurations. In one configuration, a first display device is attached to a first set of adjacent device brackets 350 and a second display device is attached to a second set of adjacent device brackets 350. Other configurations are also possible, including configurations where two display devices are mounted on two of the adjacent plurality of device brackets 350 in a top-to-bottom orientation, allowing for attachment of up to four display devices to the mounting system 10.

Figure 5:
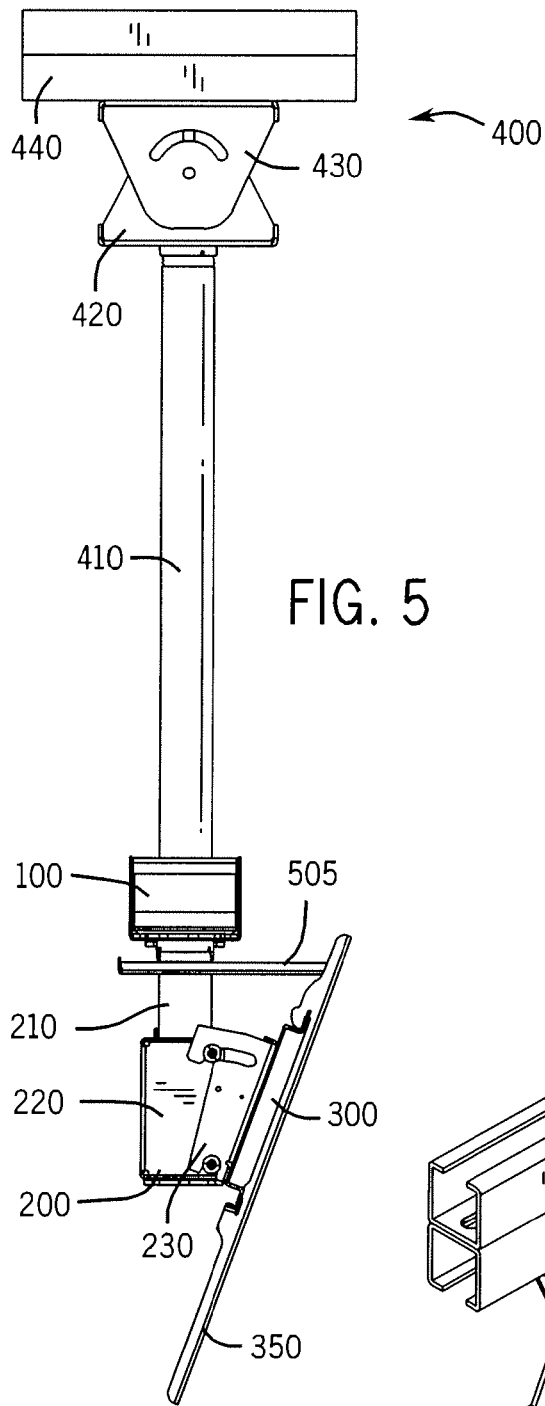
FIG. 5 is a side view of the mounting system of FIG. 1, with the cover removed.

As illustrated in FIG. 5, the mounting system 10 may include a tilt capability such that the device support member 300 and the attached devices may be orientated to at least one tilt angle. The tilt capability is particularly advantageous where the attached devices are flat panel displays that are mounted above typical eye level of a person viewing the attached display devices from either a standing or sitting position. As best seen in FIG. 4A, the tilt bracket 230 may be pivotally coupled to the mount bracket 220 such that the tilt angle of the device support member 300 is continuously adjustable within a tilt angle range. For example, in a particular embodiment, the device support member 300 is selectively tiltable from about 0 degrees (substantially vertical) through about 20 degrees of downward tilt.

With reference to FIG. 4A, the tilt bracket 230 is pivotally coupled to the mount bracket 220 by a pivot element 225 and a pivot guide 227. The pivot element 225 and the pivot guide 227 may comprise a plurality of pins, axles, rods, shafts, connecting elements, other similar elements that permit movement of the tilt bracket 230 in relation to the mount bracket 220, and combinations thereof. The tilt bracket 230 includes at least one tilt guide 233 that guides the movement of the tilt bracket 230 in relation to the mount bracket 220. As shown in FIG. 4A, the tilt guide 233 comprises an opening. However, in other embodiments, the tilt guide 233 can comprise various features including a shaft, rail, protrusion, glide, or other features. With reference to the depicted embodiment, a pair of pivot elements 225 are received proximate the bottom portions of the mount bracket 220 and the tilt bracket 230. A pair of pivot guides 227 are received near an upper portion of the mount bracket 220 and further associated with a pair of tilt guides 233. Accordingly, the tilt bracket 230 may be selectively tilted about an axis substantially parallel to the pair of pivot elements 225. The tilt guides 233 may be configured to prevent the tilt bracket 230 from rotating beyond a defined angle. Further, at least one of the pivot elements 225 and the pivot guides 227 may be selectively adjustable to alter the frictional force between the mount bracket 220 and the tilt bracket 230, thereby increasing or decreasing the difficulty of, or substantially preventing, changing the tilt angle. In a particular embodiment, at least one of the pivot elements 225 and the pivot guides 227 comprise a connecting element theaddedly engageable with at least one of the mount bracket 220 and the tilt bracket 230.

The above described configuration permits the devices attached to the mounting system 10 to be selectively tilted to a desired tilt angle. For example, in the case of a flat panel display device, the tilt angle may be adjusted to facilitate viewing the displays from a preferred viewing angle. Where the mounting system 10 is attached to an overhead surface such as a ceiling, the attached displays may be downwardly tilted as shown in FIG. 5 to accommodate viewing of the displays by individuals sitting or standing nearby.

Figure 6:
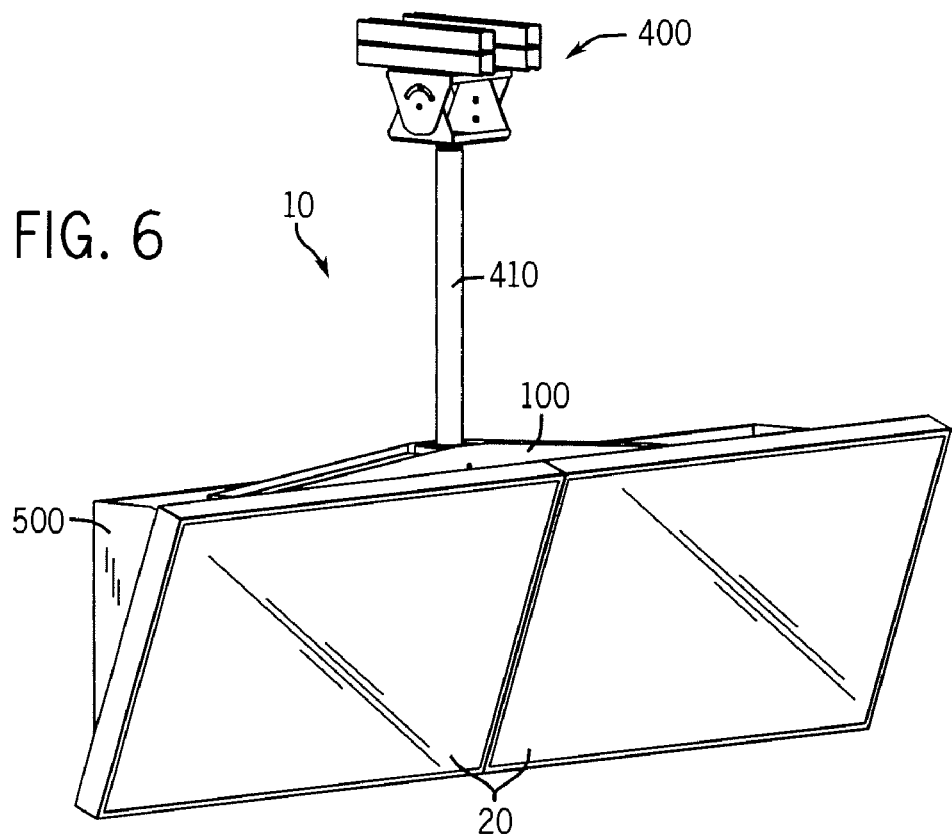
FIG. 6 is a perspective view of the mounting system of FIG. 1 shown with display devices attached thereto.

As previously noted, the mounting system 10 may be configured to support a plurality of display devices. As illustrated in FIG. 1, the device support member 300 spans multiple device mount assemblies 200, defining a display plane. FIG. 6 depicts such a configuration, with a pair of display devices 20 operatively attached to the device support member 300 and tilted to a uniform downward tilt angle. As shown, the plurality of display devices 20 are orientated in the mounting plane and positioned side-by-side. The single support member 300 ensures that the plurality of display devices 20 are at substantially the same height and thus vertically aligned with respect to one another. The mounting system 10 is configured so that the display devices 20 are adjacent to one another and no gap between the display devices 20 is readily apparent to a viewer. This mounting arrangement may be desirable when displaying related information on multiple displays, for example, information associated with an air or train schedule or other types of displayable data such as financial data. This mounting arrangement may also be applicable to video walls comprising an image displayed across a plurality of relatively closely spaced display devices 20. In such an application, the overall visual effect is enhanced by vertical alignment of the display devices 20 mounted on a single display plane. The mounting system 10 may also be configured to provide a gap between each of the plurality of display devices 20.

Figure 7:
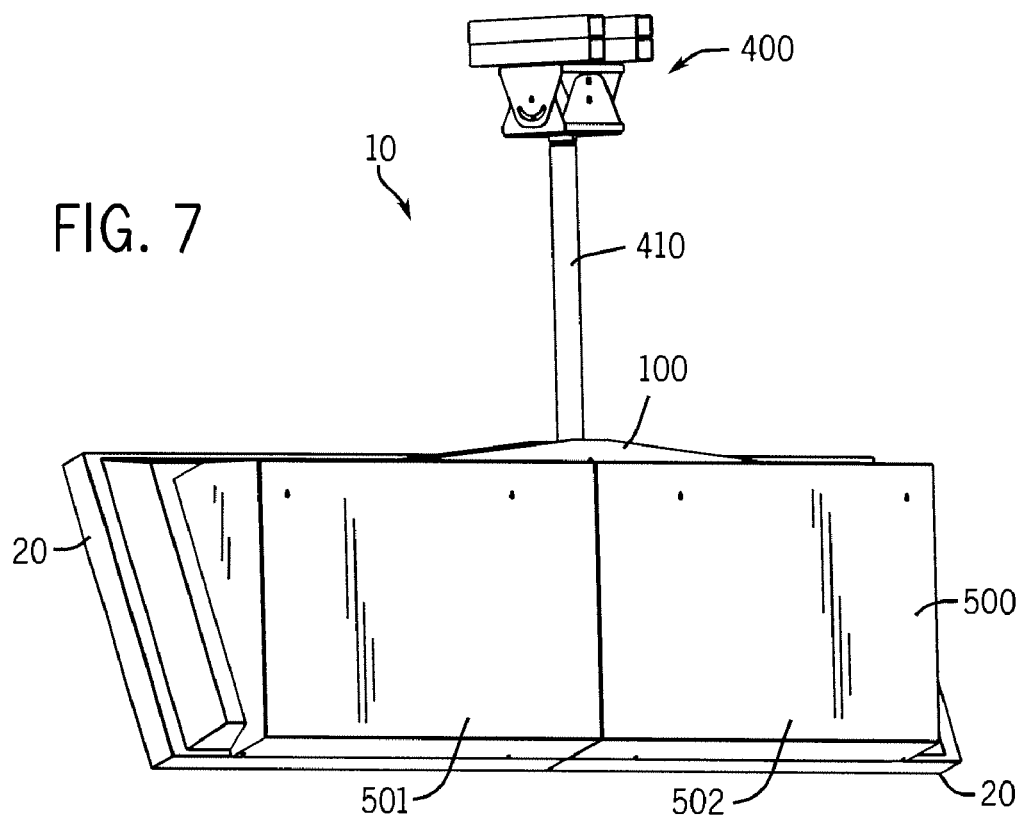
FIG. 7 is a rear perspective view of the mounting system of FIG. 6.

As shown in FIGS. 1 and 7, the mounting system 10 may include a rear cover 500 disposed opposite the display devices 20. As depicted, the rear cover 500 may comprise a first rear cover portion 501 and a second rear cover portion 502. The rear cover 500 is operatively attached to at least one of support arm 100, the device mount assembly 200, and the device support member 300. For example, as illustrated in FIG. 6, the rear cover 500 is coupled to the device brackets 350 via a plurality of struts 505. The rear cover 500 may also include one or more of a lower bracket 510 disposed near the lower portion of rear cover 500 and configured to operatively attach to the attached display devices 20. The rear cover 500 may cover at least a portion of the attached display devices 20, thereby concealing, for example, power and data cables, interfaces, and mounting features. The rear cover 500 may also conceal at least portions of the support arm 100, the device support mount assemblies 200, and/or the device support member 300 for security purposes and or enhanced aesthetics.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A display mount for suspending a plurality of display devices from a mounting surface, comprising:
    a surface bracket configured to operatively attach to a non-vertical mounting surface;
    a mount post coupled to the surface bracket and extending substantially downwardly from the non-vertical mounting surface;
    a support arm coupled to the support post;
    a plurality of mount assembly posts coupled to the support arm;
    a first device mount assembly and a second device mount assembly each coupled to a respective mount assembly post, the device mount assemblies including a support bracket and a tilt bracket, the tilt bracket rotatably coupled to the support bracket;
    a device support member coupled to both the first device mount assembly and the second device mount assembly and substantially defining a mounting plane, the device support member configured to operatively attach to a plurality of flat panel display devices orientated in the mounting plane, the device support member including an engagement lip disposed along at least one of a top portion of the device support member and a bottom portion of the device support member,
    wherein the orientation of the mounting plane is selectively adjustable to a tilt angle.

2. The display mount of claim 1, further comprising a plurality of device brackets coupled to the device support member, and wherein each of the plurality of device brackets is configured to operatively attach to at least one of the plurality of displays.

3. The display mount of claim 2, wherein the plurality of device brackets are coupled to an engagement surface along an upper portion of the device support member, wherein the device support member defines a tiltable mounting plane configured to retain the plurality of display devices in a side-by-side orientation such that the plurality of attached flat panel display devices are substantially adjoining and the plurality of attached display devices are simultaneously tiltable to the tilt angle by movement of the device support member, and wherein the device support member is configured to retain the plurality of attached display devices at substantially the same height by the coupling of the plurality of device brackets to the engagement surface.

4. The display mount of claim 2, further comprising a rear cover coupled to at least one of the plurality of device brackets, wherein the rear cover conceals the device mount assemblies.

5. The display mount of claim 1, wherein at least one of the surface bracket and the support arm is selectively rotatable about a substantially vertical axis in relation to the mount post.

6. The display mount of claim 1, wherein the distance between the surface bracket and support arm is selectively adjustable.

7. A display mount for mounting a plurality of displays to an overhead surface, comprising:
    a surface bracket configured to operatively attach to the overheard surface;
    a support arm operatively coupled to the surface bracket;
    a first device mount assembly operatively coupled to the support arm and including a first mount bracket and a first tilt bracket selectively moveable in relation to the first mount bracket;
    a second device mount assembly operatively coupled to the support arm and including a second mount bracket and a second tilt bracket selectively moveable in relation to the second mount bracket;
    a device support member coupled to the first tilt bracket and the second tilt bracket, the device support member including an engagement lip disposed along at least one of a top portion of the device support member and a bottom portion of the support member;
    a first set of device brackets attachable to a first display device and engageable with the engagement lip; and
    a second set of device brackets attachable to a second display device and engageable with the engagement lip,
    wherein the first display device and the second display device are orientated at substantially same height on the display mount by engagement of the first set of device brackets and the second set of device brackets on the engagement lip, and wherein the support member is selectively tiltable to a tilt angle.

8. The display mount of claim 7, wherein each of the first set of device brackets and each of the second set of device brackets include an attachment mechanism engageable with the engagement lip.

9. The display mount of claim 7, wherein engagement of the first set of device brackets and the second set of device brackets with the support member retains the first display device and the second display device in a substantially adjoining orientation and retains the first display device and the second display device at substantially the same height, and wherein tilting of the support member simultaneously orientates the first display device and the second display device to the tilt angle.

10. The display mount of claim 7, wherein each of the first set of device brackets and the second set of device brackets includes openings corresponding to attachment points on the first display device and the second display device.

11. The display mount of claim 7, further comprising a rear cover comprising a rear cover first portion and a rear cover second portion, each of the rear cover first portion and rear cover second portion operatively coupled to at least one of the device support member and the support arm.

12. The display mount of claim 7, further comprising a mount post having a first end operatively coupled to the surface bracket and a second end operatively coupled to the support arm.

13. The display mount of claim 12, wherein at least one of the surface bracket and the support arm is selectively rotatable about a substantially vertical axis in relation to the mount post.

14. The display mount of claim 7, wherein at least one of the first device mount assembly and the second device mount assembly includes a tilt adjustment element, and wherein the force required to alter the tilt angle is variable by way of adjustment of the tilt adjustment element.

15. The display mount of claim 7, wherein the surface bracket comprises a surface bracket assembly that is selectively tiltable such that the surface bracket assembly is operatively attachable to an inclined surface.

16. A display mount for mounting at least two displays to an overhead mounting surface, comprising:
   a support arm configured to operatively attach to an overhead mounting surface, the support arm having a first end including a first display support assembly and a second end including a second display support assembly;
   a device support member operatively coupled to the first display support assembly and the second display support assembly, the device support member defining a display plane, the device support member selectively tiltable about an axis substantially parallel to the support arm such that the display plane is tiltable to a tilt angle, the device support member including an engagement lip disposed along at least one of a top portion of the device support member and a bottom portion of the device support member; and
   a plurality of device brackets, each of the device brackets including an attachment mechanism for attachment to the engagement lip of the device support member, each of the device brackets configured to attach to a display device,
   wherein at least two of the display devices are operatively coupled to the device support member and aligned to substantially the same height by coupling the attachment mechanisms of the plurality of device brackets to the device support member.

17. The display mount of claim 16, further comprising a surface bracket assembly operatively coupled to the support arm, the surface bracket assembly configured to operatively attach to the overhead mounting surface.

18. The display mount of claim 16, wherein the at least two display devices are retained in the mounting plane and the at least two display devices are retained at the same height by coupling the attachment mechanism of the plurality of device brackets to the device support member, and wherein tilting of the mounting plane orientates the at least two display device to the tilt angle.

19. The display mount of claim 16, wherein the surface bracket assembly further includes a mount post operatively coupled to the support arm, and wherein the mount post is of a selectively adjustable length such that the distance between the support arm and the overhead mounting surface may be altered.

20. The display mount of claim 16, further comprising a rear cover comprising a first rear cover portion and a second rear cover portion, the rear cover operatively coupled to the device support member, wherein the rear cover is configured to conceal the plurality of device mount assemblies and at least a portion of each of the at least two display devices.

* * * * *